April 14, 1953   R. W. BROWN   2,634,902
JET PUMP FOR HAND VACUUM CLEANER FOR CONNECTION
WITH AIR PRESSURE HOSE, WITH SUCTION
PRODUCED BY ASPIRATING ACTION
Filed July 3, 1950
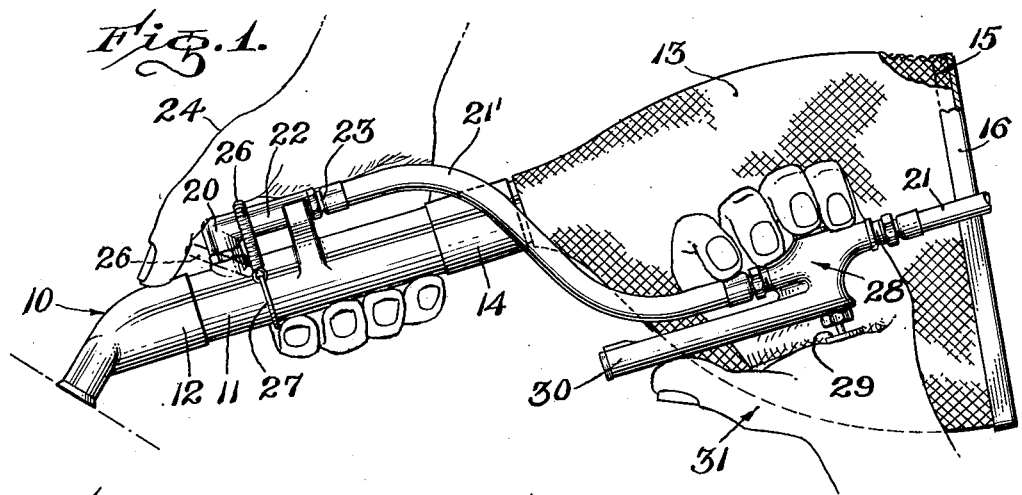
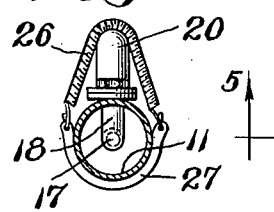
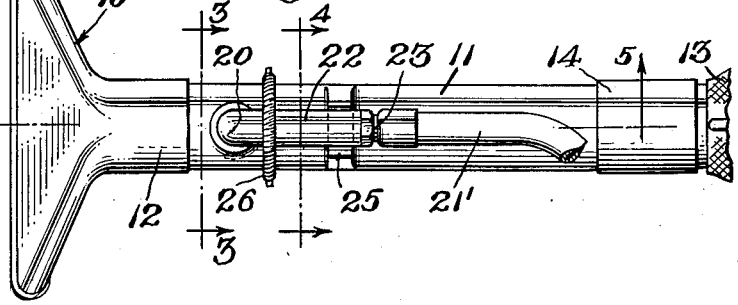
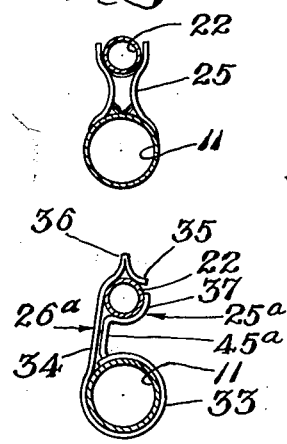
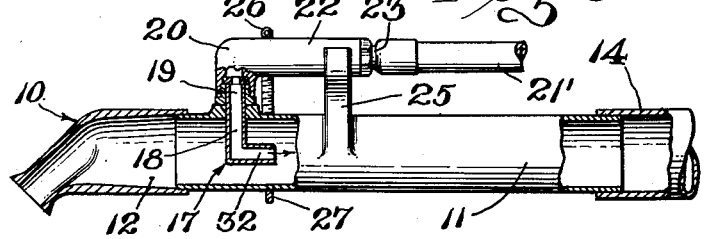
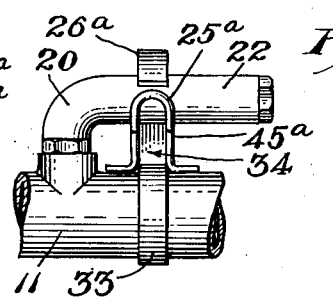
INVENTOR.
Robert Wagner Brown

Patented Apr. 14, 1953

2,634,902

UNITED STATES PATENT OFFICE 2,634,902

JET PUMP FOR HAND VACUUM CLEANER FOR CONNECTION WITH AIR PRESSURE HOSE, WITH SUCTION PRODUCED BY ASPIRATING ACTION

Robert W. Brown, West Los Angeles, Calif.

Application July 3, 1950, Serial No. 171,815

1 Claim. (Cl. 230—95)

This invention relates to vacuum cleaners of the type in which suction in a cleaning tool is created by the aspirating action of a jet of air or other fluid injected into a suction passage connected to the cleaning tool. The present invention is particularly applicable to a hand cleaner for cleaning the interiors of motor vehicles, and the primary object of the invention is to provide such a cleaner which is particularly adapted to be connected to the tire inflation hose of a motor vehicle service station.

I am of course aware that the broad principle of employing the aspirating effect of an air jet to create suction in a suction cleaning tool, is quite old and has been embodied in many different forms in prior cleaners. The cleaner of my invention is primarily distinguished from such prior cleaners in having means adapting it for quick connection to a tire inflation hose, whereby the cleaning unit may be readily attached to the hose for a cleaning operation and may be as readily detached therefrom to leave the hose for its normal function of inflating tires. Accordingly, the principal object of my invention is to provide a suction cleaner having means providing maximum facility of attachment of the cleaner to a tire inflation hose, and detachment therefrom.

A further object is to provide a cleaner having maximum simplicity of construction and quite inexpensive, so that it may be available to all service stations without being burdensome in cost.

A further object is to provide a suction cleaner which is so constructed and arranged as to utilize a tire inflation air hose without any change whatever in the hose. The usual tire inflation hose embodies, at its extreme end, a nozzle for coupling it to a valve stem of a pneumatic tire, and, a short distance back of such nozzle, a valve which may be actuated by one hand while the nozzle is being held in the other. Such valve, in a most popular form of air hose, also embodies a pressure gage. An important object of the invention is to provide a cleaner which is so constructed and arranged that it may be grasped in one hand in a manner to best facilitate the manipulation of the cleaning tool inside a vehicle, while the valve of the air hose is grasped in the other hand for controlling the application of suction producing air to the cleaner. More particularly, it is my object to provide such a cleaner in which the portion of the cleaner to be grasped by the hand is that portion to which the nozzle of the air hose is connected, and in which the connection to the air hose is such that both the hose connection and the cleaner may be simultaneously grasped in one hand, thereby to avoid any possibility of the hose becoming detached while the cleaner is being manipulated.

A further object is to provide a relatively simple and quickly operated means for detachably connecting an air hose to a jet operated cleaner.

Other objects will become apparent in the ensuing specification and appended drawings in which:

Fig. 1 is a side view of a cleaner embodying my invention, the view illustrating the attachment of the cleaner to an air hose and the operation of the cleaner and the hose by the hands of an operator;

Fig. 2 is a plan view of the cleaner with a portion of the hose attached thereto;

Fig. 3 is a cross sectional view taken on the line 3—3 of Fig. 2;

Fig. 4 is a cross sectional view taken on the line 4—4 of Fig. 2;

Fig. 5 is a side view of the same, partly in axial section, taken on the line 5—5 of Fig. 2;

Fig. 6 is a cross sectional view illustrating a modified means for latching the air hose to the cleaner;

Fig. 7 is a side view of a portion of the cleaner embodying the modification of Fig. 6.

As an example of one form in which the invention may be embodied, I have shown in Figs. 1 to 5 inclusive a vacuum cleaner which embodies a very simple and inexpensive arrangement including a suction cleaning tool 10, a tube 11 providing a suction passage communicating with the outlet neck 12 of the tool 10, and an air filtering and dust collecting back 13 detachably connected, by means of a coupling 14, to the rear end of tube 11. Bag 13 may be of any conventional design, preferably of a relatively simple and inexpensive type, and may, for example, have a broad rear end defining a mouth 15 for discharging collected refuse therefrom, mouth 15 being normally closed by a channel shape spring clip 16 embracing the lips thereof. Such a construction is common in dust collecting bags and does not constitute a part of the present invention. Likewise the coupling 14 may be of any conventional design, being illustrated herein in the very simple form of a collar having a telescoping fit over the end of tube 11 and remaining coupled thereto by frictional engagement therewith. Collar 14 may be of a somewhat resilient material (such as rubber) to facilitate such friction fit. However, any simple form of coupling of any type in common use within the art, may be employed, and the specific design of the coupling forms no part of the present invention.

A jet nozzle 17 of L shape, for creating suction within tube 11, has an inlet arm 18 which extends through a fitted opening in the wall of tube 11 and is suitably secured thereto as by welding or brazing, the arm 18 having an outer extremity projecting beyond tube 11 to define a nipple 19 to which may be coupled the nozzle 20 of a conventional tire inflation hose 21. The usual hose nozzle is of L shape, having a relatively long neck 22 which is connected, through a swivel coupling 23, to a short section 21' of the hose.

The present invention provides an arrangement whereby the neck 22 and adjacent portion of hose section 21' may lie parallel to tube 11, so that both the tube and the nozzle 20 may be simultaneously grasped in one hand (indicated at 24 in Fig. 1) of the operator. To this end, there is provided, on tube 11, a short distance rearwardly of nipple 19, a saddle 25 in which the rear portion of neck 22 may rest with the mouth of nozzle 20 receiving nipple 19 as shown in Fig. 5. Nozzle 20 is held in this position, and thus latched to the tube 11, by a latch 26 engaging the neck 22 between the tip of the nozzle and the saddle 25. The latch 26 is preferably of a type adapted to exert a yielding tension against the nozzle 20, and is arranged to simultaneously press the neck 22 against saddle 25 and the nozzle mouth against the nipple 19 so as to establish an air tight connection therewith. At the same time, the latch is adapted to readily yield to unlatching pressure exerted thereagainst. To this end, the latch 26 may comprise a stretchable yoke or band such as the coil spring illustrated in Figs. 1-5, with the ends thereof anchored to tube 11 in any suitable manner, such as by being hooked into the ends of a yoke 27 secured to the under side of tube 11. The length of the band 26 is such that it will be stretched and under tension in the latching position shown in the drawings. The tension of band 26 will maintain the mouth of nozzle 20 against nipple 19 and the neck portion 22 thereof in seating engagement with saddle 25. Thus the hose is securely retained in connection with the tube 11 in a position in which the operator's hand, extending around both the hose and the tube 11 as indicated in Fig. 1, may secure the attachment so that any accidental pull against the hose will not lift it out of the saddle 25.

The conventional hose 21 is provided with a valve 28 and an operating plunger 29 therefor, usually with a pressure gage 30 associated therewith. In the use of the invention, the valve 28 is held in the other hand 31 of the operator, with operating plunger 29 engaged against the heel of the operator's thumb in a conventional manner. For a right handed person, the most convenient method of using the cleaner is to hold the nozzle 20 and tube 11 in the right hand and the valve 28 in the left hand, as indicated.

It may now be noted that the invention provides a very simple cleaner embodying simply a cleaning tool 10, a suction tube 11, a dust collecting and air filtering bag 13, and latching means, with the tool 10 connected to the forward end of tube 11 and the bag 13 connected to the rear end thereof, and with an arrangement whereby the hand of the operator may simultaneously grasp the tube 11 and air hose nozzle 20 so as to support the cleaner and at the same time manipulate it in a cleaning operation. The cleaner will be substantially balanced in the hand of the operator, with the weight of the tool 10 counterbalancing the weight of the bag 13, and vice versa. The bag 13 may be slightly larger in proportion to the dimensions of the remainder of the cleaner than is illustrated in Fig. 1, but need be only large enough to hold an accumulation of a few cleanings, being adapted for ready disposal of its contents at any time.

When an occasion for use of the cleaner arises, the operator simply applies the tube 11 to the nozzle 20 of the air hose, fitting the mouth of the nozzle over nipple 19 and slipping the neck 22 into the saddle 25, then secures it by stretching latch 26 over the brow of the nozzle 20, moving the latch from the detached position shown in dotted lines in Fig. 1 to the securing position shown in full lines. The cleaner is then ready for use. The valve 28 is then picked up in the other hand, and by pressing plunger 29, a jet of air is directed from the nozzle arm 32 of jet nozzle 18, the arm 32 being disposed along the axis of tube 11 and directed away from suction tube 10 and toward collecting bag 13, whereby, through the aspirating effect of the air stream passing out of nozzle arm 32, suction will be created in tool 10. As a result, dust and debris encountered by tool 10 will be drawn thereinto and blown rearwardly through tube 11 into bag 13.

When the operator has finished using the cleaner, he simply pushes latch 26 forwardly with this thumb, slipping it over the forward end of nozzle 20 to the detached position shown in dotted lines, whereupon the nozzle 20 may be slipped off of nipple 19, and the cleaner put away. The entire conversion operation may be completed in a fraction of a minute.

An alternative form of latching device is indicated generally at 26a in Fig. 6. Such device is constructed from a short length of spring metal ribbon material, formed into substantially the shape of the numeral 6, including a bearing loop 33 rotatably encircling tube 11, an arm 34 extending from one end of loop 33, a hook 35 formed on the free end of arm 34, and a suitable finger piece such as the ear 36 positioned to be readily engaged by the operator's thumb or finger, for rotating the latch member 26a about the axis of tube 11. Thus the hook 35, which is shaped and positioned so as to yieldingly engage the neck 22 of nozzle 20, may be sprung over neck 22 by applying circumferential pressure to finger piece 36, and may be similarly slipped off of neck 22 by a pull in the opposite direction.

Band 33 is normally of slightly smaller diameter than tube 11 so as to apply sufficient constricting pressure thereto to develop a frictional engagement therewith such as to prevent free rotation of latch 26a about tube 11. Thus the latch will stay in any position to which it may be moved.

A saddle 25a may, in this form of the invention, have a seat portion 37 extending around only one side of nozzle neck 22, so that latch member 26a may engage against the other side of nozzle neck 22. The web portion of saddle 45a, joining seat member 37 to tube 11 may be positioned so as to form an abutment for engagement by the arm 34 of latch 26a, for positioning the latch 26a, when detached from nozzle 20, in a normal position from which a minimum amount of movement will separate hook 35 from seat 37 sufficiently to receive neck 22.

Seat member 25a may, as shown in Fig. 7, be in the form of an opened wire loop with the lower ends thereof spread apart to straddle loop 33 of the latch member 26a, and secured to tube 11 as by spot welding or brazing, and with the intermediate, looped portion thereof disposed at the top as shown.

I claim:

In a cleaning apparatus in which a stream of air is induced to enter a cleaning tool by the aspirating action of an air jet directed away from said tool, produced by a conventional L-shaped air hose nozzle, having as one arm thereof a shank portion for attachment to an air hose and having, as the other arm thereof, a relatively short mouth portion; in combination: an air flow tube adapted to be connected to said cleaning tool at one end and to a filter at its other end; an L-shaped jet member having a tubular arm extending radially through a wall of said tube and secured thereto, said tubular arm having an outer end projecting from said tube to define a nipple receivable in said mouth portion of the air nozzle, and said jet member having, at its inner end, a tubular discharge arm projecting toward the end of said tube which is attachable to the filter; a saddle-like rest element on said tube, spaced from said projecting nipple toward the last-mentioned end of the tube, positioned to receive the shank portion of said air nozzle when the latter is parallel to said tube and when the mouth portion thereof is coupled to said nipple element; and a latch element in the form of a stretchable loop having respective end portions attached to respective sides of said tube, said loop being adapted to receive said air nozzle with a central portion of the loop yieldingly bearing against said air nozzle shank at a point intermediate the mouth portion of the air nozzle and said rest element, said latch element being adapted to have a combined stretching and swinging movement whereby it may be slipped off the mouth end of said air nozzle to detach said air nozzle from said tube.

ROBERT W. BROWN.

References Cited in the file of this patent

UNITED STATES PATENTS

| Number | Name | Date |
| --- | --- | --- |
| 1,606,492 | Ackerman | Nov. 9, 1926 |
| 2,143,296 | Beeman | Jan. 10, 1939 |
| 2,164,552 | Taylor | July 4, 1939 |
| 2,392,645 | Clobridge | Jan. 8, 1946 |
| 2,475,832 | Gilliland | July 12, 1949 |

FOREIGN PATENTS

| Number | Country | Date |
| --- | --- | --- |
| 199,338 | Great Britain | June 11, 1923 |